United States Patent [19]
Ueda et al.

[11] 3,891,992
[45] June 24, 1975

[54] SINGLE LENS REFLEX CAMERA

[75] Inventors: Hiroshi Ueda, Nara; Yoshio Kuramoto, Toyonaka, both of Japan

[73] Assignee: Minolta Camera Kabushiki Kaisha, Japan

[22] Filed: Feb. 8, 1974

[21] Appl. No.: 440,859

[30] Foreign Application Priority Data
Feb. 9, 1973 Japan .......................... 48-16257

[52] U.S. Cl. .......................... 354/152; 354/196
[51] Int. Cl. .......................... G03b 19/12
[58] Field of Search .......... 354/152, 153, 154, 155, 354/156, 157, 158

[56] References Cited
UNITED STATES PATENTS

| | | | |
|---|---|---|---|
| 3,442,192 | 5/1969 | Sato | 354/156 |
| 3,507,199 | 4/1970 | Sato | 354/155 |
| 3,628,436 | 12/1971 | Sato | 354/156 |
| 3,653,311 | 4/1972 | Sato | 354/156 |

Primary Examiner—Samuel S. Matthews
Assistant Examiner—E. M. O'Connor

[57] ABSTRACT

A single lens reflex camera comprises a movable reflecting mirror biased to a viewing position; a diaphragm operating means provided in the camera body for urging a diaphragm unit, provided in an interchangeable lens mounted on the camera body, against a below-mentioned tendency of said diaphragm unit to maintain the diaphragm in a released position, said diaphragm unit being urged in a closing direction. There is provided an air damper which is interconnected with a member for shifting the movable reflecting mirror from the viewing position to the picture taking position prior to the shutter release, and for driving the diaphragm operating means in closing direction prior to the aforesaid shutter release.

7 Claims, 6 Drawing Figures

SINGLE LENS REFLEX CAMERA

BACKGROUND OF THE INVENTION

This invention relates to a single lens reflex camera, wherein there are provided a movable reflecting mirror, diaphragm operating means and drive means, the drive means operating the movable reflecting mirror and diaphragm operating means, in association with the release operation, prior to the shutter release operation.

A single lens reflex camera of this type is known. However, a disadvantage of such a conventional single lens reflex camera is that, in actuating the movable reflecting mirror and diaphragm operating member in association with the release operation as described, a large number of members must be simultaneously and instantaneously actuated, causing considerable noise, and such noise, because it occurs immediately before the shutter release, is often responsible for missing a picture, particularly a picture of animals or a person in snapshooting.

Hitherto, there have been proposed many means for absorbing or neutralizing such a noise occurring from the movement of the movable reflecting mirror, but none of them involves means for absorbing the noise resulting from the movement of the diaphragm operating member.

In the case of a single lens reflex camera the noise resulting from the movement of the diaphragm is often greater than that resulting from the movement of the mirror. The reason is that, in a single lens reflex camera, various types of objective lenses may be interchanged, and the necessity to operate the various diaphragms used in connection with the aforesaid objective lenses necessitates the use of a spring having a strong spring force, which is the principal cause of the objectionable noises.

SUMMARY OF THE INVENTION

It is a principal object of the present invention to provide, in a single lens reflex camera, means for reducing or eliminating noise resulting from the movement of a movable reflecting mirror from the viewing position to the picture taking position, which movement is effected in association with the release operation, and noise resulting from the movement of the diaphragm operating member for closing the diaphragm of an exchange lens mounted on the camera from its open position to its preset position.

Another object of the present invention is to provide, in a single lens reflex camera, means for reducing or eliminating noise accompanying the return movement of the movable reflecting mirror from the picture taking position to the viewing position, which movement is automatically effected after the closure of the shutter which has been released in the shutter release operation, as well as to diminish the noise caused by the return movement of the diaphragm operating member from the preset diaphragm position to the diaphragm open position.

A further object of the present invention is to provide a noise-absorbing mechanism, suited for absorbing noises resulting from the movement of the diaphragm operating member, which is adapted to close the diaphragm for an interchangeable lens from its open position to a set value of diaphragm aperture, and which is adapted to bring the diaphragm from the aforesaid set position to its open position, in association with the shifting of the movable reflecting mirror from the viewing position to the picture taking position, which is effected in association with the release operation, as well as with the return movement of the aforesaid movable reflecting mirror from the picture taking position to the viewing position, which is effected in association with the completion of the shutter closing.

SUMMARY OF THE INVENTION

In a single lens reflex camera, which includes a diaphragm operating member driven in association with the rotation of a movable reflecting mirror between the viewing position and the picture taking position, and is biased to the viewing position, said diaphragm operating member, when an interchangeable lens is mounted on the camera, maintaining the diaphragm of the said lens and a diaphragm stop setting member in an open position against the tendency of said diaphragm which is urged in the closing direction, there is provided an air damper which is interconnected with the member which drives the movable reflecting mirror from the viewing position to the picture taking position, in association with the release operation, as well as to cause said diaphragm operating means to move the diaphragm from its open position to a set value of diaphragm aperture, and in addition to reverse the movements of the aforesaid members after the termination of the shutter closing.

The aforesaid air damper serves to decelerate or damp the movement of the movable reflecting mirror, which is caused by the reflecting mirror actuating member, as well as that of the diaphragm operating member, so that no noise may be caused by those movements.

The air damper is composed of a closely fitting piston and cylinder with the piston being slidable in the cylinder, a resilient member being disposed between the piston and the inner end of the cylinder for absorbing the impact which would otherwise be caused therebetween when the former is forced into the latter, thereby eliminating the sound caused by such impact.

BRIEF DESCRIPTION OF THE DRAWINGS

The accompanying drawings illustrate a preferred embodiment of the present invention, wherein.

DETAILED DESCRIPTION OF THE INVENTION

Figure 1:
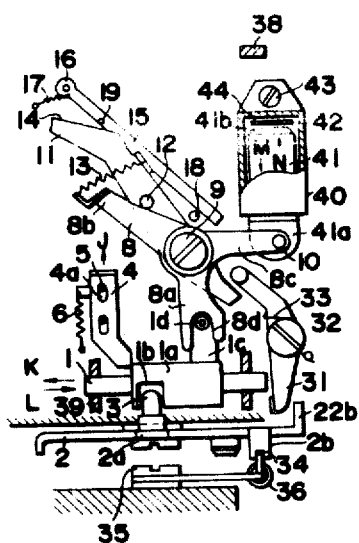
FIG. 1 is a side elevational view of an essential part of the embodiment, which shows the condition of the respective members prior to a release operation.

The following description relates to a preferred embodiment of the present invention with reference to the accompanying drawings. Shaft 1 has a large diameter portion 1a which is provided with recess 1b extending transversely to the axial direction of the shaft and with an arm 1c, having a projection 1d, projecting at right angles to the axial direction thereof, the aforesaid shaft 1 being slidable in the axial direction thereof as shown by the arrows K, L, by side plate 39 of a mirror box provided in the camera body partly shown.

Figure 2:
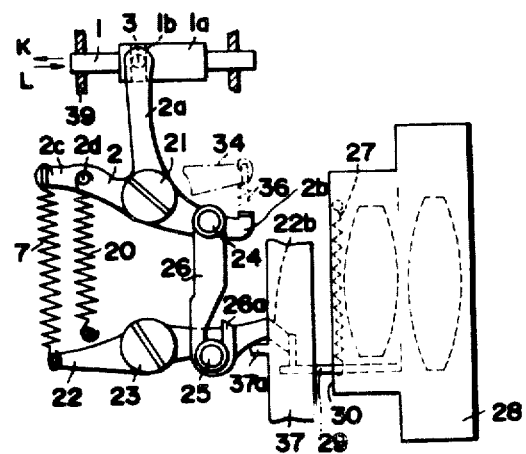
FIG. 2 is a bottom view of FIG. 1.

Referring to FIG. 2, an inverted T-shaped three-arm lever 2 is rotatably mounted on the mirror box by shaft 21 and has a first arm 2a provided with pin 3 which is received in the aforesaid recess 1b in engaging relation therewith. The lever is urged in the counter-clockwise direction as viewed in FIG. 2 by a spring 20 connected between projection 2d, provided on a third arm 2c, and the mirror box.

Now turning back to FIG. 1, locking piece 4 engageable with the left end of large diameter portion 1a is provided with guide slot 4a into which extends guide pin 5 provided on the camera body. The locking piece is slidable transversely to the sliding direction of the aforesaid shaft 1. Locking piece 4 is normally urged in the direction opposite the direction of arrow J by a spring 6 and engages the left end of large diameter portion 1a, thereby stopping the leftward movement of large diameter portion 1a, as shown in FIG. 1, the locking piece being movable in the direction of arrow J, against the aforesaid tendency, in association with the shutter release operation, thereby unlocking the shaft 1.

Reflecting mirror actuating lever 8 is rotatably supported on the mirror box by shaft 9. The lever 8 has three arms 8a, 8b and 8c, the first arm 8a having forked portion 8d, in which pin 1d of the aforesaid arm 1c is engaged.

Reflecting mirror operating lever 11, which is rotatably supported on the camera body by the aforesaid shaft 9, carries a spring 13 which is connected at its other end to the second arm 8b of actuating lever 8, and is provided with a pin 12 engaging the aforesaid second arm 8b. Engaging face 14 of reflecting mirror operating lever 11, when the lever 11 is rotated in the clockwise direction, is brought into engagement with pin 19 of movable reflecting mirror 15, thereby rotating the movable reflecting mirror 15 from the viewing position to the picture taking position against the force of spring 17, the aforesaid movable reflecting mirror 15 being rotatably mounted on the mirror box by shaft 16 and urged in the clockwise direction by the spring 17 so as to be normally in the viewing position, in which it engages with stop member 18.

Air damper 40 consists of cylinder 42 and piston 41 slidable therein. Cylinder 42 is supported on the mirror box by pin 43, while piston 41 has an outer or lower end 41a connected by shaft 10 to third arm 8c of the aforesaid reflecting mirror actuating lever 8. Cylinder 42 has resilient member 44 disposed in the innermost end face thereof for absorbing the impact which will be caused when piston 41 is shifted in the direction of arrow N to bring its inner end 41b into engagement with the innermost wall of cylinder 42.

Reflecting mirror manipulating lever 31, which is engageable with the aforesaid reflecting mirror operating lever 11, has an end portion which projects outwardly of the camera body. The lever 31 is rotatably mounted on the camera body by shaft 32 and urged in the clockwise direction by a spring 33. The lever 31 normally retracted from operating lever 11, but urges operating lever 11 in the clockwise direction when lever 31 is rotated in the counter-clockwise direction against the force of spring 33.

In FIG. 2, diaphragm operating lever 22, which is rotatably supported on the mirror box by shaft 23, has the end of one arm connected to a spring 7 of which the other end is connected to third arm 2c of the aforesaid three-arm lever 2. The other arm of diaphragm operating lever 22 is provided with a pin 25 in its midportion and the operating piece 22b provided at its end portion engages with pin 29 interconnected with the diaphragm of interchangeable lens 28. The aforesaid pin 25 is enclosed in a U-shaped hook 26a provided in the end portion of connecting lever 26 which is rotatably mounted on shaft 24 provided on the second arm 2b of three-arm lever 2, and the pin 25 and U-shaped hook 26a are maintained in engagement by the action of spring 7. The aforesaid interconnecting pin 29 is urged in the direction of closing the diaphragm to the minimum diaphragm aperture by a spring 27 provided in lens 28. In FIG. 2, interconnecting pin 29 is urged in the direction of opening the diaphragm against the spring force 27, by engagement with operating piece 22b.

Designated at 34 is a return lever, which is pivotally mounted on the camera body by shaft 35 (FIG. 1) and is urged in the clockwise direction as viewed in FIG. 2 by a spring 36 connected between the camera body and lever 34. The return lever is so designed as to be urged from a first position shown by a dotted line in FIG. 2 to a second position where it is brought into engagement with second arm 2b of three-arm lever 2 of FIG. 2, and vice versa and is cooperatively connected with a shutter (not shown). By cocking a shutter lever, the return lever is shifted to the first position, and upon the closing of the shutter after the shutter release, said return lever is shifted to the second position, thereby causing three-arm lever 2 to rotate in the clockwise direction against the force of spring 20.

Shown at 37 is a diaphragm manipulating member having projection 37a engageable with diaphragm operating lever 22. The member 37 is slidable in the direction of movement of operating piece 22b and is adapted to move upwardly as viewed in FIG. 2.

Figure 3:
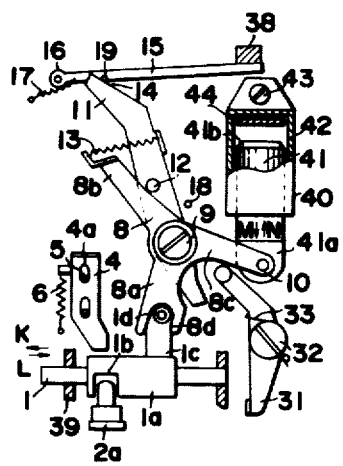
FIG. 3 is a side elevational view of the essential part of the same embodiment, showing the condition of the respective members at the time of the exposure after the release operation has been effected.

Shown at 38 is a shutter locking member, with which the movable reflecting mirror is brought into engagement when the latter is urged to the picture taking position as shown in FIG. 3, whereby the shutter is unlocked.

Figure 4:
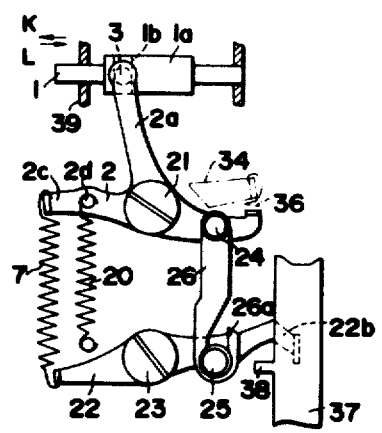
FIG. 4 is a bottom view of FIG. 3.

In operation, when the shutter is completely closed by the shutter release operation, return lever 34 is caused to rotate in the clockwise direction as viewed in FIG. 2, whereby three-arm or trifurcate lever 2, which has assumed the position of FIG. 4, is rotated in the clockwise direction against the force of spring 20, thereby shifting shaft 1 rightwardly, and thus, locking piece 4 is brought into engagement with large diameter portion 1a of shaft 1 as shown in FIG. 1. By this time, return lever 34 has returned to the retracted position as shown by the dotted line in FIG. 2 by the closing action of the shutter.

At this time, the movable reflecting mirror remains in engagement with stop member 18 under the action of spring 17 and is thus in the viewing position, with air damper 40 being in a position in which piston 41 is forced into the cylinder 42 to the upper limit thereof, while diaphragm operating lever 22, interconnected to spring 7, is caused to rotate in a clockwise direction, with operating piece 22b thereof arresting interconnecting pin 29 in a position to retain the diaphragm in the open position, against the force of spring 27.

Now, when the release operation is effected, locking piece 4 is shifted in the direction of arrow J against the force of spring 6, so that three-arm lever 2 is rotated in the counter-clockwise direction by spring 20, thereby causing the shift of shaft 1 in the direction of arrow K. Simultaneously with such movement of shaft 1, reflecting mirror actuating lever 8 is caused to rotate in the clockwise direction under deceleration since said lever 8 draws piston 41 out of the cylinder 42 in the direction of arrow M. This causes reflecting mirror operating lever 11 to rotate in a clockwise direction, whereby the engaging face 14 thereof rotates movable reflecting mirror 15 in the counter-clockwise direction from the viewing position toward the picture taking position.

Simultaneously with the above described movements, three-arm lever 2, by way of interconnecting lever 26, urges diaphragm operating lever 22 in a counter-clockwise direction, so that interconnecting pin 29 is moved by spring 27, following the counter-clockwise directional movement of operating piece 22b, whereupon the diaphragm is brought to a preset diaphragm aperture which has been set by a stop setting member of the interchangeable lens, and thus the conditions ready for exposure are provided, as shown in FIGS. 3 and 4.

Upon the termination of the exposure, return lever 34 is urged from the first position to the second position. Through this movement, lever 34 is brought into engagement with three-arm lever 2, to rotate the same in a clockwise direction, whereby shaft 1 is urged in the direction of arrow L. This causes actuating lever 8 to rotate in a counter-clockwise direction, whereupon piston 41 is forced into cylinder 42. Accordingly, the counter-clockwise directional movement of lever 8 is effected under deceleration. It is noted that when the inner or upper end 41b of piston 41 impacts upon the upper inner wall of cylinder 42 resilient member 44 deforms elastically and thereby absorbs the kinetic energy of piston 41, thus reducing the sound of such impact.

Due to the counter-clockwise movement of actuating lever 8, reflecting mirror operating lever 11 is caused to rotate in a counter-clockwise direction, whereby reflecting mirror 15 returns to the viewing position shown in FIG. 1 from the picture taking position of FIG. 3. With the movement of the reflecting mirror, diaphragm actuating lever 22 is rotated in the clockwise direction, during which movement operating piece 22b is brought into engagement with interconnecting pin 29 so as to urge the latter to the diaphragm opening position against the force of spring 27. Thus, the conditions of FIGS. 1 and 2 are restored.

As is apparent from the foregoing, whenever the movable reflecting mirror is rotated and whenever the diaphragm is actuated by the diaphragm operating member, the movement of the diaphragm operating member is necessarily decelerated with the aid of the air damper 40, so that no noise will be caused.

Figure 5:
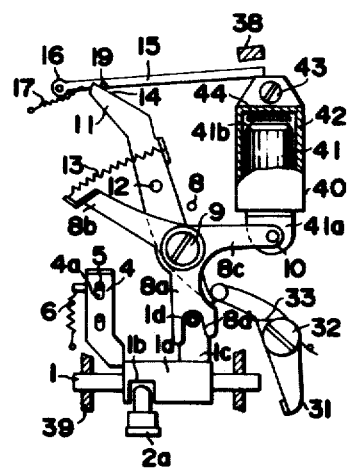
FIG. 5 is a side elevational view of the same embodiment, wherein a reflecting mirror operating member is manually actuated prior to the release operation.

Under the conditions of FIGS. 1 and 2, if it is desired that the release operation be effected after the reflecting mirror has been caused to assume the picture taking position, prior to but independently of the release operation, reflecting mirror manipulating lever 31 is manipulated to rotate in the counter-clockwise direction, so as to cause reflecting mirror operating lever 11 alone to rotate in the clockwise direction, with actuating lever 8 maintained in the position of FIG. 1, and thus reflecting mirror operating lever 11 retains the reflecting mirror in the picture taking position as shown in FIG. 5.

In the embodiment described above, as will be easily recognized by persons ordinarily skilled in the art, some known conventional link mechanism can be coupled with lever 8 or shaft 1 for the release of the shutter in place of the aforementioned combination of mirror 15 and shutter locking member 38. In this case, a buffer member can be substituted for locking member 38.

Further, it is to be noted that in the described embodiment the air damper is not operated when the mirror or the diaphragm is manually operated independently of the shutter release.

Figure 6:
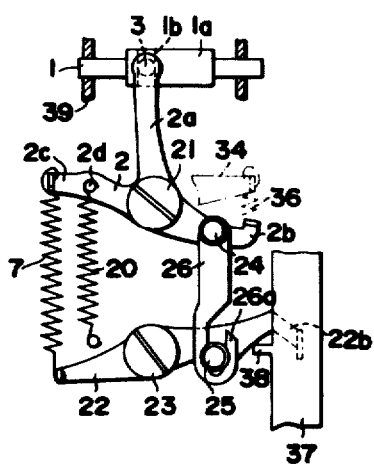
FIG. 6 is a bottom view of the same embodiment, wherein a diaphragm operating member is manually actuated prior to the release operation.

Meanwhile, if it is desired that diaphragm actuating lever 22 alone be actuated, independently of the release operation, so as to close the diaphragm, diaphragm manipulating lever 37 may be manipulated to slide upwardly, as shown in FIG. 6. In this case, although diaphragm operating lever 22 is urged in the counter-clockwise direction, three-arm lever 2 is maintained in the position of FIG. 2, because pin 25 of diaphragm operating lever 22 is maintained in the U-shaped hook 26b of connecting lever 26. Thus, the shifting of the reflecting mirror is achieved by the release operation, for effecting the exposure.

As many apparently widely different embodiments of this invention may be made without departing from the spirit and scope thereof, it is to be understood that the invention is not limited to the specific embofiment described, except as defined in the appended claims.

We claim:

1. A single lens reflex camera comprising:
   a reflecting mirror movable between a viewing position and a picture taking position and urged to assume said viewing position;
   a reflecting mirror operating member for shifting said mirror, said operating member being movable between a first position and a second position in which said mirror assumes said viewing and picture taking positions respectively;
   an interchangeable lens removably mounted on said camera and having a diaphragm;
   a diaphragm operating member engaging said diaphragm and movable between a first position in which said diaphragm is brought to its open position, against a tendency thereof to close, and a second position in which said diaphragm is allowed to close to a minimum aperture;
   means urging said diaphragm from its open position to its closing position;
   means urging said diaphragm operating member to said first position;
   an actuating member movable between a cocked position and a rest position, to urge said reflecting mirror operating member and said diaphragm operating member from said first position to said second position respectively;
   means for locking said actuating member in the cocked position and unlocking the same in association with a shutter release operation; and
   an air damper for decelerating the movement of said actuating member, said air damper including a cylinder supported by the camera body and a piston slidable within said cylinder and interconnected with said actuating member.

2. A single lens reflex camera as defined in claim 1, wherein there is provided means for releasing a shutter after said actuating member has driven said reflecting mirror operating member and diaphragm operating member from the first position to the second position in association with the shutter release operation and under deceleration by said air damper.

3. A single lens reflex camera as defined in claim 1, wherein there is provided means for shifting said actuating member from the rest position to the cocked position after the termination of the exposure by movement of the shutter which has been released by the release operation.

4. A single lens reflex camera as defined in claim 1, further comprising:
a reflecting mirror manipulating member for manually shifting said reflecting mirror operating member from the first position to the second position against the tendency thereof when said actuating member is locked in the cocked position by said locking means.

5. A single lens reflex camera as defined in claim 1, further comprising:
a diaphragm manipulating member for shifting said diaphragm operating member from the first position to the second position against the tendency thereof when said actuating member is locked in the cocked position thereof by said locking means.

6. A single lens reflex camera as defined in claim 1, wherein said actuating member is equipped with an actuating lever on which is pivotally supported a connecting lever having a U-shaped hook at one end, and the diaphragm operating member is provided with a pin engageable with said hook, said U-shaped hook being in engagement with said pin to thereby shift said diaphragm operating member from the first position thereof to the second position when the actuating lever is shifted from the cocked position to the rest position, and said pin being loose in said U-shaped hook when said actuating lever is locked by the locking means and said diaphragm manipulating member is in operation.

7. A single lens reflex camera as defined in claim 1, wherein a resilient member is disposed on the innermost end face of said cylinder, so that when said piston is forced into said cylinder, the inner end face of the piston is brought into abutment with said resilient member.

* * * * *